(12) United States Patent
Eatough

(10) Patent No.: US 7,802,065 B1
(45) Date of Patent: Sep. 21, 2010

(54) PEER TO PEER BASED CACHE MANAGEMENT

(75) Inventor: David Arthur Eatough, Herriman, UT (US)

(73) Assignee: Crimson Corporation, Dover, DE (US)

( * ) Notice: Subject to any disclaimer, the term of this patent is extended or adjusted under 35 U.S.C. 154(b) by 339 days.

(21) Appl. No.: 10/837,729

(22) Filed: May 3, 2004

(51) Int. Cl.
*G06F 13/18* (2006.01)

(52) U.S. Cl. .............. 711/158; 711/130; 711/162; 714/6

(58) Field of Classification Search ........... 711/158, 711/130, 162; 714/6
See application file for complete search history.

(56) References Cited

U.S. PATENT DOCUMENTS 5,384,770 A * 1/1995 Mays et al. ............... 370/300
6,453,404 B1 * 9/2002 Bereznyi et al. .......... 711/171
7,107,423 B2 * 9/2006 Blair et al. ................ 711/167
2003/0187931 A1  10/2003 Olsen et al.
2004/0049570 A1 * 3/2004 Frank et al. ............... 709/223
2005/0154697 A1 * 7/2005 Altaf et al. ................. 707/1

* cited by examiner

*Primary Examiner*—Sanjiv Shah
*Assistant Examiner*—Jae U Yu
(74) *Attorney, Agent, or Firm*—Austin Rapp & Hardman

(57) ABSTRACT

A system for managing a local cache that is part of a distributed cache is disclosed. The system includes a computing device. The computing device includes or is in electronic communication with a computer-readable medium. The computer-readable medium includes executable instructions for implementing a method for managing a local cache that is part of a distributed cache. In the method the local cache that is part of the distributed cache is identified. The local cache has a plurality of local files. Remote cache information is requested from a plurality of peers. The remote cache information is received. The remote cache information includes a file list identifying files in one or more remote caches. A priority is determined for each file of the plurality of local files based on the remote cache information. A local cache reduction operation is started that uses the priority to determine whether a local file is deleted.

35 Claims, 9 Drawing Sheets

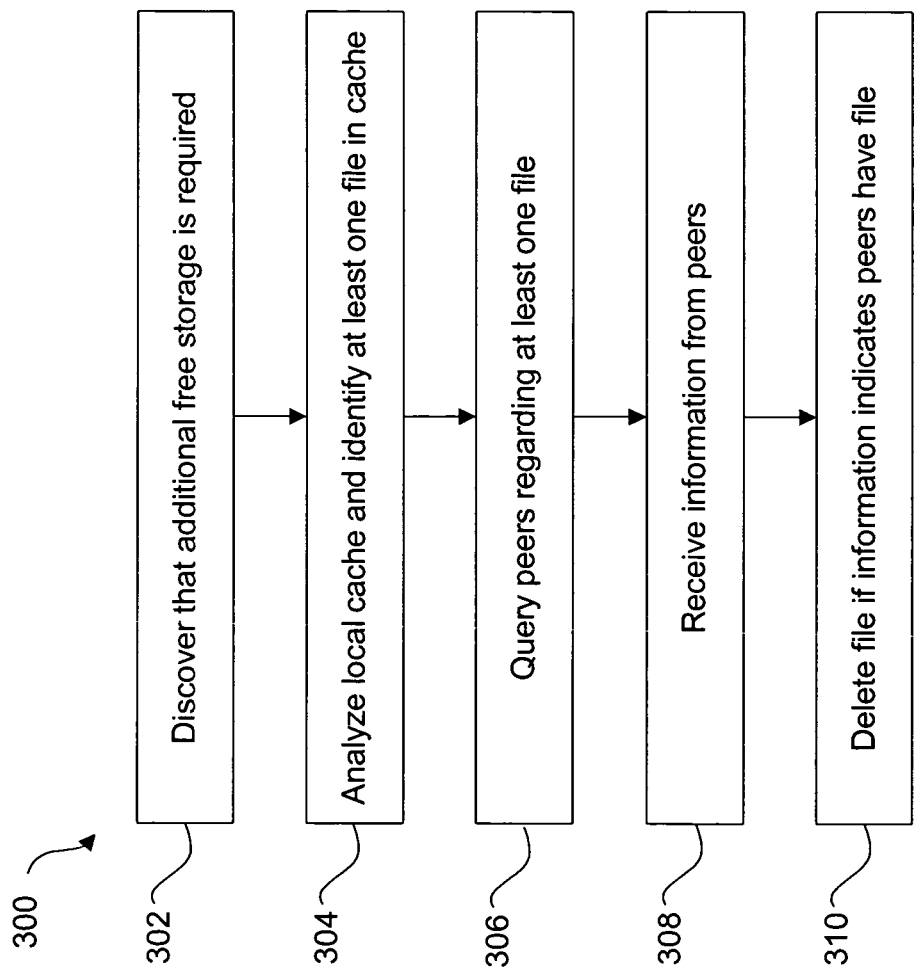

PEER TO PEER BASED CACHE MANAGEMENT

TECHNICAL FIELD

The present invention relates generally to computer system administration. More specifically, the present invention relates to systems and methods for managing a distributed cache.

BACKGROUND

Computer and communication technologies continue to advance at a rapid pace. Indeed, computer and communication technologies are involved in many aspects of a person's day. For example, many devices being used today have a small computer inside of the device. These small computers come in varying sizes and degrees of sophistication. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new software or updating current software is typically an ongoing task. Sometimes installing new software may take a substantial amount of time to perform. In addition, if mistakes are made during installing, problems may occur thereafter which could decrease the production of an employee. As corporate performance and end-user productivity have become increasingly dependent on computers, computer support personnel are often used to maintain computers for a company. The support personnel are also under pressure to perform tasks as efficiently as possible which may include minimizing effects to existing computer systems or minimizing any disturbance of computer users.

There are many computer programs now available to help computer support personnel to provide computer support and maintenance. Some of these programs can effectively update software, install new software and/or operating systems by copying certain data to the storage device of the computer system. The time and resources required to copy large amounts of data to one or more computer systems depend on a variety of factors including, but not limited to, the type of computer system(s), where the data is stored, what kind of computer network is being used, etc.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 3 is a flow diagram of a general method for peer to peer based cache management;

DETAILED DESCRIPTION

Figure 2:
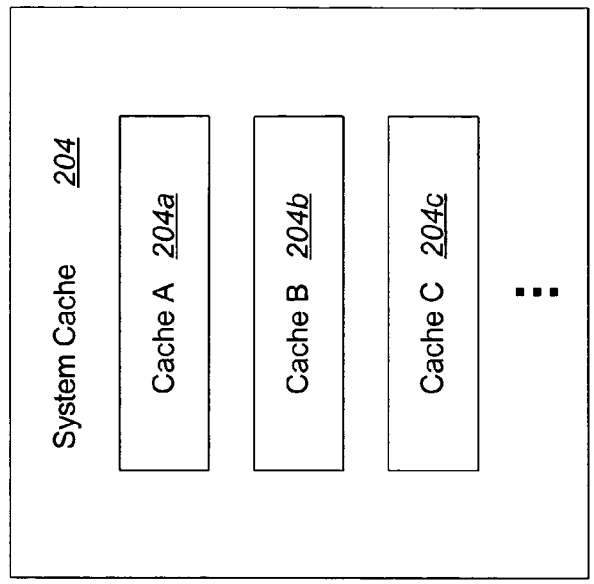
FIG. 2 is a logical block diagram of a system cache.

A method for managing a distributed cache is disclosed. A local cache that is part of a distributed cache is provided. Remote cache information is requested from at least one peer. The remote cache information is received from the at least one peer. A priority of a file in the local cache is determined based on the remote cache information. A local cache reduction operation is started that uses the priority to determine whether the file is deleted.

The remote cache information may indicate whether the file is in a remote cache on the at least one peer. The remote cache information may include a file list identifying files in the remote cache. The remote cache information may also include free cache space information. The remote cache information may also include a type of device. The remote cache information may also include a remote priority for each of the files in the remote cache. Remote cache information may be requested from a plurality of peers. The remote cache information may be requested from a plurality of peers of the same multicast alias domain.

The local cache and the remote cache may both be part of the distributed cache. The local cache may include a plurality of files. A priority for each file of the plurality of files in the local cache may be determined. Multiple files may be deleted from the local cache, wherein each of the multiple files had the lowest priority in the local cache.

A computer-readable medium for storing program data is also disclosed. The program data comprises executable instructions for implementing a method for managing a local cache that is part of a distributed cache. A local cache that is part of a distributed cache is identified. The local cache comprises a plurality of local files. Remote cache information is requested from a plurality of peers. The remote cache information is received. The remote cache information comprises a file list identifying files in one or more remote caches. A priority is determined for each file of the plurality of local files based on the remote cache information. A local cache reduction operation is begun that uses the priority to determine whether a local file is deleted.

At least one local file may be deleted from the local cache, wherein the at least one local file had the lowest priority in the local cache.

A system for managing a local cache that is part of a distributed cache is disclosed. The system includes a computing device. The computing device includes or is in electronic communication with a computer-readable medium. The computer-readable medium includes executable instructions for implementing a method for managing a local cache that is part of a distributed cache. In the method the local cache that is part of the distributed cache is identified. The local cache has a plurality of local files. Remote cache information is requested from a plurality of peers. The remote cache information is received. A priority is determined for each file of the plurality of local files based on the remote cache information. A local cache reduction operation is started that uses the priority to determine whether a local file is deleted.

A method for managing a distributed cache is also disclosed. A local cache is provided that is part of a distributed cache. Cache-related messages from a plurality of peers are monitored. A priority of a file in the local cache is updated based on the cache-related messages from the plurality of peers. A local cache reduction operation is started that uses the priority to determine whether the file is deleted.

The monitoring may be performed continuously. In addition, the local cache reduction operation may not iterate through all files in the local cache. Multiple files may be deleted from the local cache, wherein each of the multiple files had the lowest priority in the local cache.

A system for managing a local cache that is part of a distributed cache is disclosed. The system includes a computing device. The computing device includes or is in electronic communication with a computer-readable medium. The computer-readable medium includes executable instructions for implementing a method for managing a local cache that is part of a distributed cache. In the method the local cache that is part of the distributed cache is identified. The local cache has a plurality of local files. Cache-related messages from a plurality of peers are monitored. A priority of a file in the local cache is updated based on the cache-related messages from the plurality of peers. A local cache reduction operation is started that uses the priority to determine whether the file is deleted.

A plurality of file priorities in the local cache may be updated based on the cache-related messages from the plurality of peers. At least one local file from the local cache may be deleted, wherein the at least one local file had the lowest priority in the local cache.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion; however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order unless explicitly stated herein.

Although the embodiments herein are described with reference to multicast jobs, they may be applied to broadcast jobs, point to multipoint, and multipoint to multipoint jobs as well.

A multicast alias domain consists of all computers that can see each other's multicast traffic without crossing a router. Another possible definition is that a multicast domain consists of all computers where the IP hop count between any two computers is zero. Because the hop count between all machines in a multicast domain is zero the arrangement of the machines within the multicast domain does not typically matter. One approach for determining alias domains is described in U.S. patent application Ser. No. 09/927,708, filed Aug. 10, 2001 and entitled "Method and Apparatus for Dynamically Discovering Alias Domains," hereby incorporated by reference in its entirety.

The embodiments herein may be used with multicast alias domain. However, these embodiments may also use other multipoint communication domains rather than multicast alias domains. For example, the techniques herein may be used with broadcast domains or any other multipoint communication domains.

Figure 1:
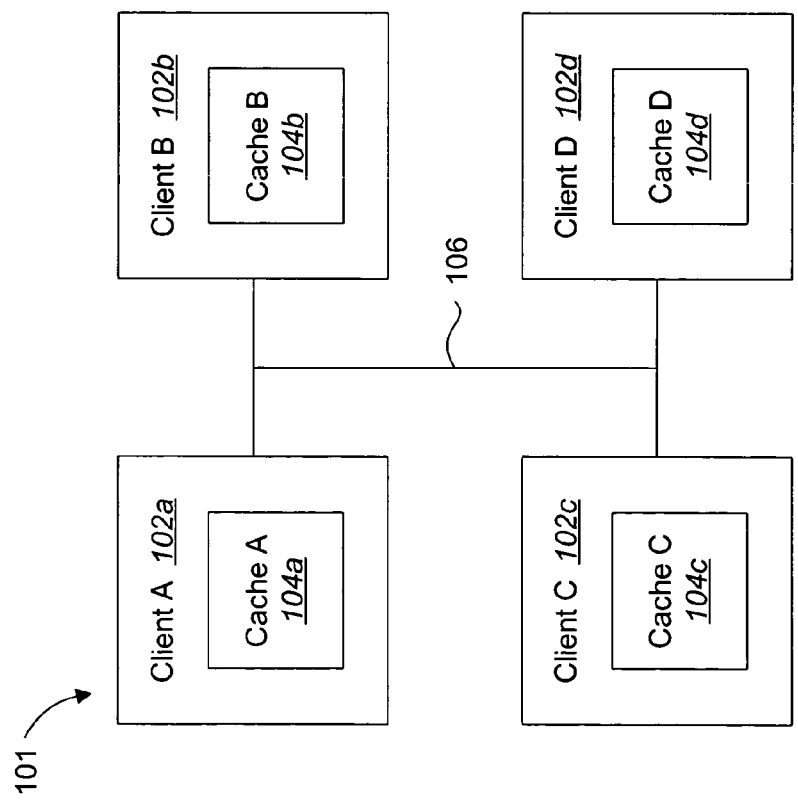
FIG. 1 is a logical block diagram of a peer to peer based cache management system.

FIG. 1 is a logical block diagram of a peer to peer based cache management system 101. This system 101 provides a method for making cache management decisions using peer to peer technologies. The system 101 includes a system cache 104 (illustrated in FIG. 2). The system cache 104 comprises a number of caches 104a, 104b, 104c, etc., that are typically stored on several computer systems 102. The system cache 104 includes the caches on each individual computer 102. In the example of FIG. 1, the system cache 104 includes cache A 104a, cache B 104b, cache C 104c and cache D 104d. The various client computers 104 are in electronic communication with one another through a computer network 106.

Each computer 102 has a cache 104 that holds files to be used by the system or any application which uses the system. The amount of disk space that an individual cache can use is limited. Occasionally, such as when downloading a new file, it will become necessary to free up some space in the cache. The systems and methods disclosed herein accomplish this by prioritizing what file should be kept based upon information from peers.

FIG. 2 is a logical block diagram of a system cache 204. The system cache 204 is a distributed cache. Individual components of the cache 204 may be stored on several different computers 102 and/or different storage devices. The system cache 204 comprises a number of caches 204a, 204b, 204c, etc., that are typically stored on several computer systems 102.

FIG. 3 is a flow diagram 300 of a general method for peer to peer based cache management. A computer discovers 302 that additional free storage is required. It then analyzes 304 and identifies at least one file in its cache. The computer then queries 306 peers regarding the at least one file. Information from the peers is received 308. The file is then deleted 310 if the information indicates that one or more peers have the file.

In one embodiment, what file should be kept is based upon the file being present on the peers as shown in the following pseudo code.

CleanupCache (spaceNeeded)
{
for each file in cache
{
   discover if neighbors have file, including various storage info options
   based on neighbors having file priority of keeping the file
}
while currentCacheSpace is less than spaceNeeded
   delete lowest priority file
}

Figure 4:
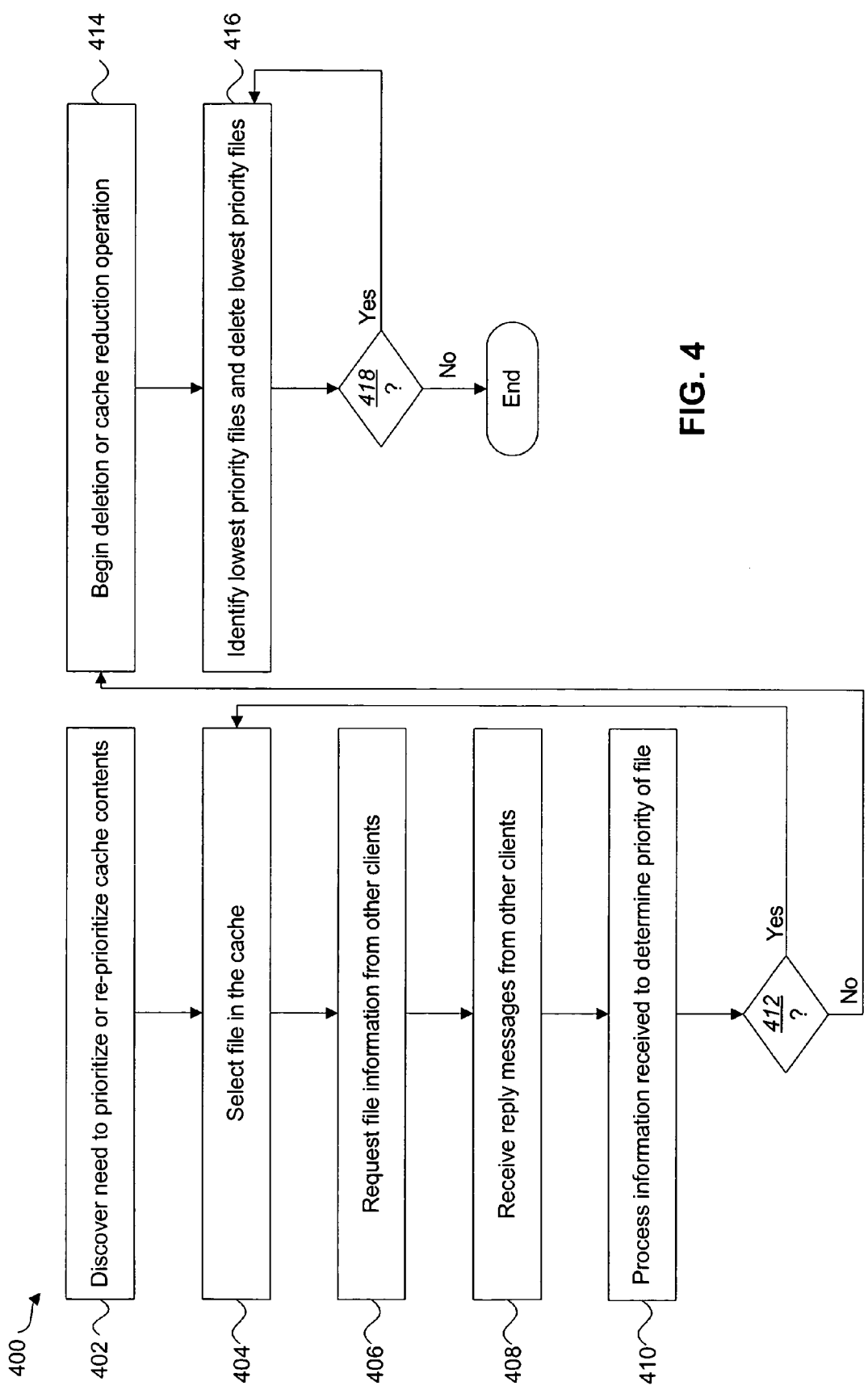
FIG. 4 is another flow diagram of a method for peer to peer based cache management.

FIG. 4 is another flow diagram 400 of a method for peer to peer based cache management. The computing device discovers 402 a need to prioritize or re-prioritize its cache contents. The computing device may need to prioritize or re-prioritize its cache contents when it needs additional storage. Alternatively, the computing device may be configured to prioritize or re-prioritize its cache contents at regular intervals or to continuously prioritize based upon the multicast or broadcast communication of other computers that are prioritizing their cache.

For each file currently in the client's cache a file discover message is sent 406 out using multicast, or alternately broadcast, to discover which computers on the network, or a subset of the computers on the network (e.g., the computers in the multicast alias domain) have the file. Thus, in this embodiment before the message is sent 406 a file is selected 404. This discovery message also allows the client to provide other information regarding the file such as: expected time they will keep the file, total amount of free cache space the client has, whether or not the computer is mobile, and so on.

In the embodiment of FIG. 4, the method may iterate through files in the cache in a sequential fashion to obtain information from peers regarding the files. In this method, the system selects 404 a file in the cache. The file may be selected 404 based on various criteria including, but not limited to, file size, priority, alphabetical order, etc. If the system already has a prioritized cache, meaning the system already knows which files are most likely to be deleted, it is more efficient to ask about these files first. Once the first file is selected 404, the client computing device 102 sends 406 a message to peers requesting file information. The client 102 may send 406 out the request file information message using multicast or broadcast. The peers receiving the message respond with information about the file. For example, in one embodiment the peers may respond if they have the file. The replies from the peers are received 408 by the computer system. The reply messages received 408 may include additional information, which will be more fully discussed below.

The computing device receives 408 the replies and processes 410 the information received to determine the priority of the file. The file may be given a new priority or may keep the same priority level it had. Then the method determines 412 if there is another file in the cache to prioritize or re-prioritize. If there is another file, it selects 404 that next file for processing and continues with the actions 406-412 as shown. If there is not another file, the method continues as shown.

Based upon the information received 408 the client will determine how important it is that it keeps the file. This is done so that a file that is not on any peer will have a higher priority for being kept than a file that is on many peers. Other factors, such as the amount of free cache space on the peers, the expected time to keep the file in the cache, and so on, will be considered in determining how important it is to keep the file.

The deletion operation or cache content reduction operation begins 414. The method identifies 416 all the lowest priority files and deletes all the files having the lowest priority. It then determines 418 whether any more files need to be deleted. If more files need to be deleted, the method may again identify 416 all the next lowest priority files and delete them. When enough files have been deleted, the method ends.

Figure 11:
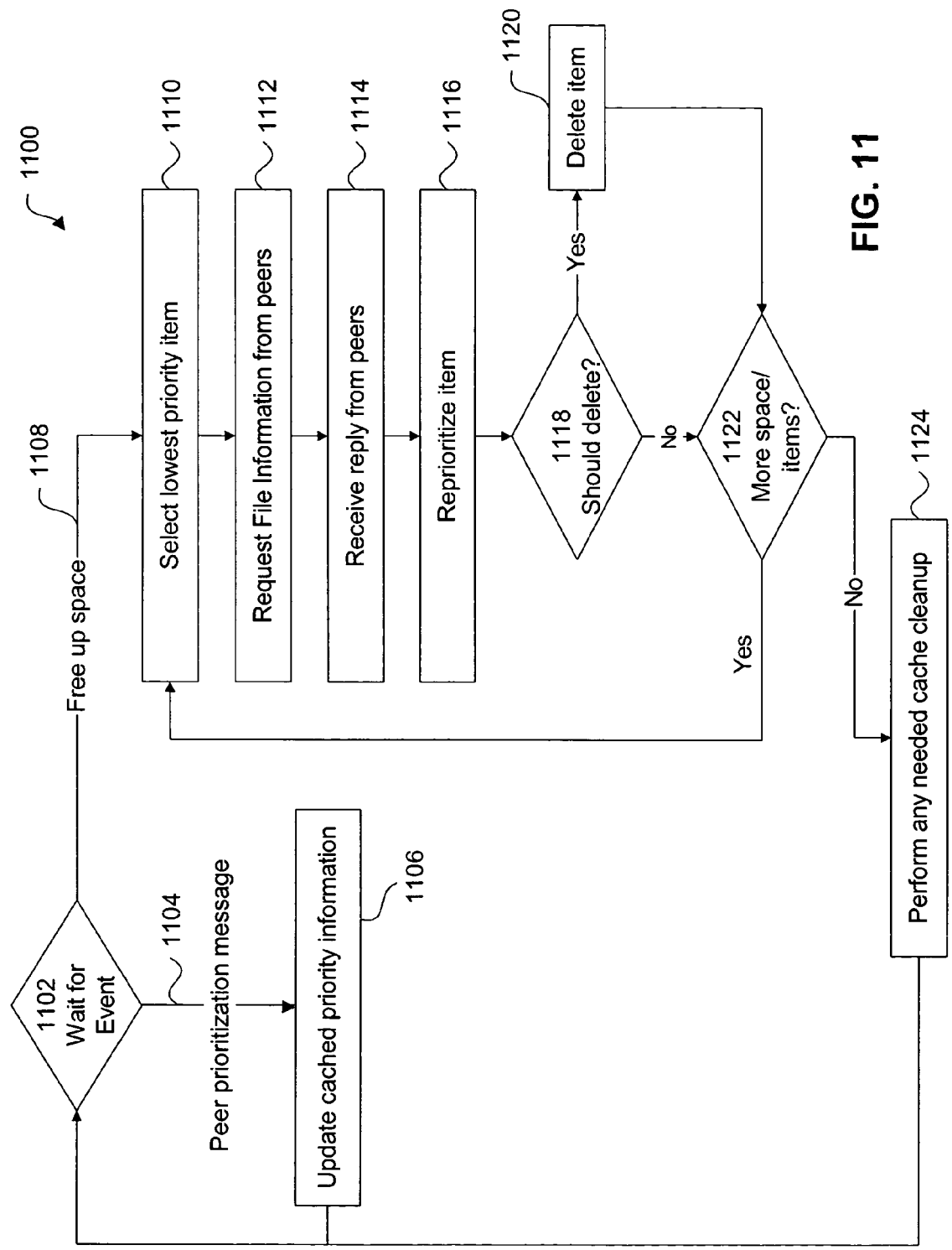
FIG. 11 is an exemplary block diagram of a method for continuous peer to peer based cache management.

FIG. 11 is another flow diagram 1100 of a method for peer to peer based cache management. In this embodiment the computer systems perform continuous cache management by monitoring cache-related messages from its peers. In order for continuous cache management to be performed it is necessary that the cache-related messages, including the file information responses 408, be a multicast, broadcast, or other multipoint protocol. A point to point protocol may be used for the response without departing from the scope of the invention. It should be pointed out that a multipoint protocol is needed for continuous cache management, which is also within the scope of the present invention.

Referring again to the embodiment of FIG. 11, the cache management system waits 1102 for an event to occur. As illustrated, in the embodiment of FIG. 11 this event may be either a peer prioritization message 1104 or a need to free up space in the cache 1108. When a peer sends a reply to a file information message using a multipoint protocol, the cache management system detects 1102 this message. Based on the information in the message the cache of the local machine can be updated 1106.

For example, assume that the client A, system 102a of FIG. 1, needs to free up space in its cache. It 102a queries 306 its peers for information about the file as it receives 308 information from its peers. Other systems 102b, 102c and 102d on the network can also receive this information if the response is sent using a multicast, broadcast, or other multipoint protocol. This enables the other systems 102b, 102c, and 102d to update 1106 their cached priority information using the reply sent to the first system 102a.

At some point the system will need to free up space 1108 in its own cache. When this happens, rather than starting with any file in the cache, it will select 1110 the lowest priority item. It will then request 1112 file information from its peers using multicast, broadcast, or other multipoint protocol. It will receive 1114 reply messages from one or more of its peers and then use this information to reprioritize 1116 the item.

After the item or file has been reprioritized 1116, it will determine 1118 if the file can be deleted outright. This determination can be based upon the number of peers that have the file, how old the file is, how likely the other peers are to keep the file, etc. Those skilled in the art will appreciate the ways in which this determination may be made without departing from the scope of this invention. If the determination 1118 is made that the file can be deleted, or in other words the system determines that the priority is low enough that it can be deleted without checking all of the other files first, it will be deleted 1120 before processing additional items. If it is determined 1118 that the file should not be deleted outright, the method continues as follows.

The system then checks 1122 to see if more space is needed and if there are more items. If more space is still needed and there are still more items, the method returns to step 1110 for the additional items. If no more space is needed the system will not process the additional items.

Once all of the items have been processed any needed cache cleanup will be performed 1124. This process is explained in steps 414 through 418 in FIG. 4.

The embodiment shown in FIG. 11 provides the advantage that not all files in the cache may need to be prioritized in order to cleanup the cache. Those skilled it the art will realize that this embodiment requires an active agent on the system, which may not be desirable in certain contexts.

Those skilled in the art will also recognize that some of the steps outlined in FIG. 11 may be skipped, or performed in a different order without departing from the teachings of the invention. For example, if the priority of a file is sufficiently low steps 1112 through 1116 of the process may be skipped so that the file is deleted without any additional information from peers being requested.

Figure 5:
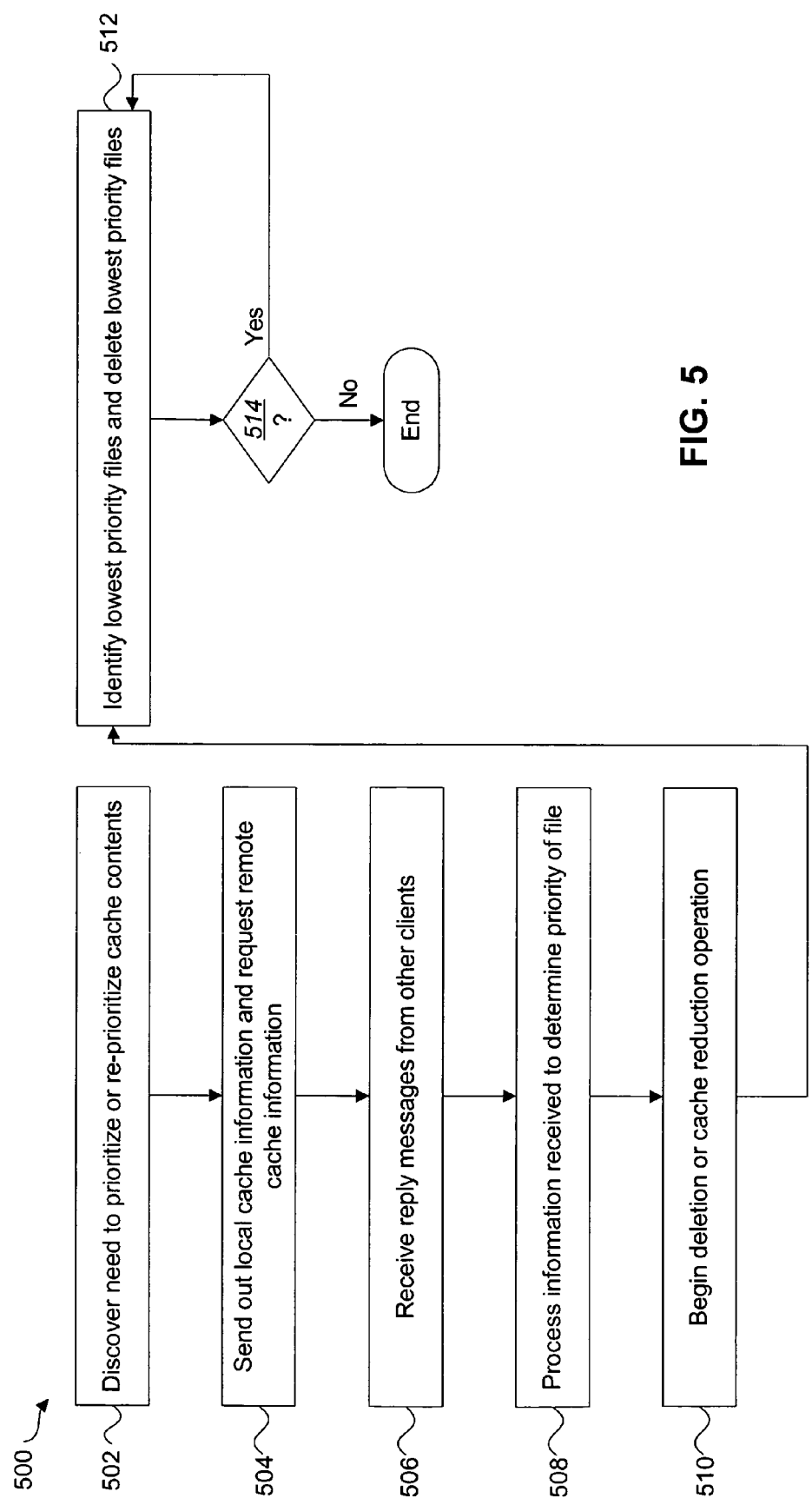
FIG. 5 is another flow diagram of a method for peer to peer based cache management.

FIG. 5 is another flow diagram 500 of a method for peer to peer based cache management. The method of FIG. 5 does not sequentially iterate through all the files in its local cache, but sends 504 out one message regarding its entire local cache. The computing device 102 discovers 502 a need to prioritize or re-prioritize its cache contents. The computing device 102 may need to prioritize or re-prioritize its cache contents when it needs additional storage. Alternatively, the computing device may be configured to prioritize or re-prioritize its cache contents at regular intervals.

In the embodiment of FIG. 5, the method composes a message regarding its local cache contents and sends 504 it to its peers requesting cache information. In this embodiment the client may send 504 out a message including a list of all of the files in its local cache. The client may send out 504 the message using multicast or broadcast. The peers receiving the message respond by indicating what files, if any, they have of the files in the computing device's local cache. Their reply messages may include additional information, which will be more fully discussed below. For example, the reply message may include a list of the contents of the peer's local cache, along with the peer's priorities for each of its files.

The computing device receives 506 the replies and processes 508 the information received to determine the priority of each file. Based upon the information received the client will determine how important it is that it keeps the file. This is done so that a file that is not on any peer will have a higher priority for being kept than a file that is on many peers. Also the type of peer may be taken into consideration so that a file on a dedicated file server will have lower priority for being kept than a file that is on a less reliable system, such as a laptop computer. The deletion operation or cache content reduction operation begins 510. The method identifies 512 all the lowest priority files and deletes all the files having the lowest priority. It then determines 514 whether any more files need to be deleted. If more files need to be deleted, the method may again identify 512 all the lowest priority files and delete them. When enough files have been deleted, the method ends.

Figure 6:
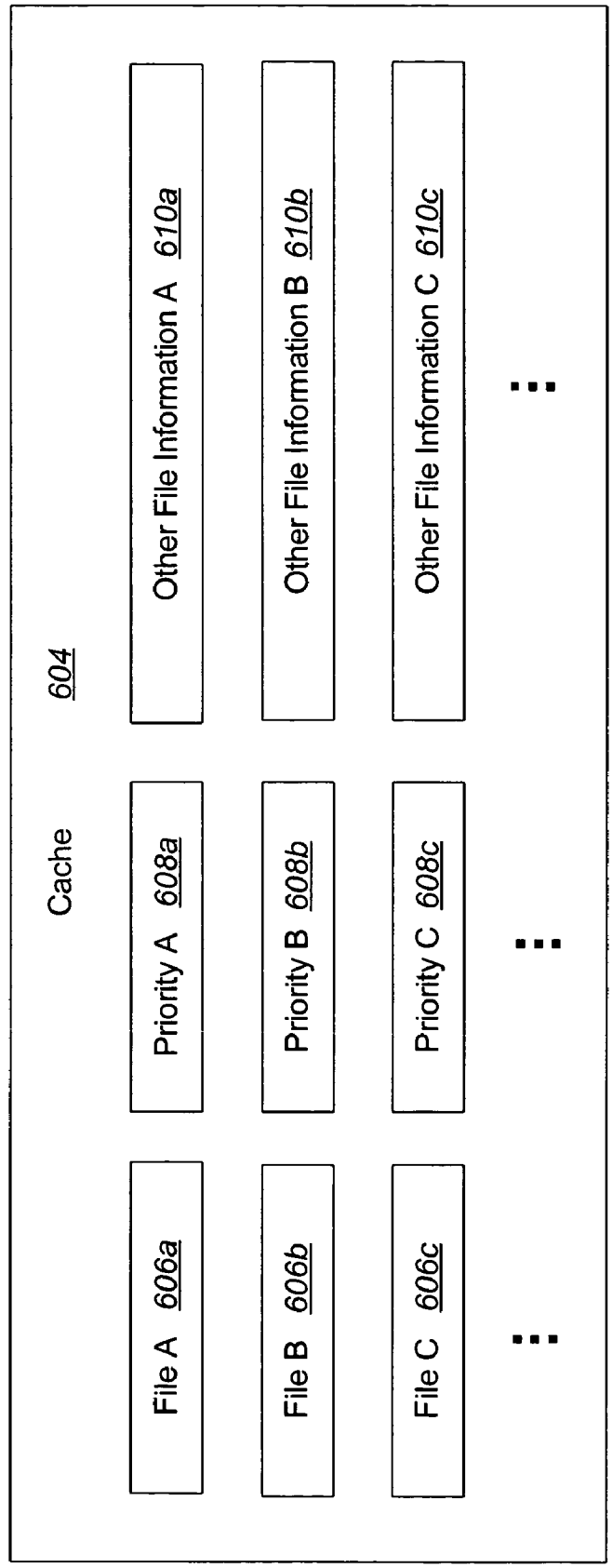
FIG. 6 is a logical block diagram of a cache on a computing device.

FIG. 6 is a logical block diagram of a cache 604 on a computing device. The cache 604 includes one or more files 606. Each file 606 has a priority 608 associated with it. The priority 608 indicates to the computing device how important it is to keep that file stored in its local cache 604. Other file information 610 may also be associated with the file 606. Other file information 610 may include various parameters. For example, the other file information 610 may include a time to keep value that indicates how long the device 102 is to keep the file 606 in its cache 604 without deleting it. A source value may also be included which indicates where the file 606 was obtained from. A file size may be included. A last date modified may also be included. A hash or CRC for the file may also be included. The number of peer systems 102 that have the file may be included. The likelihood of the peer systems 102 keeping the file may also be included. Many other pieces of information that are relevant to the file 606 may be stored in the other file information 610.

Figure 7:
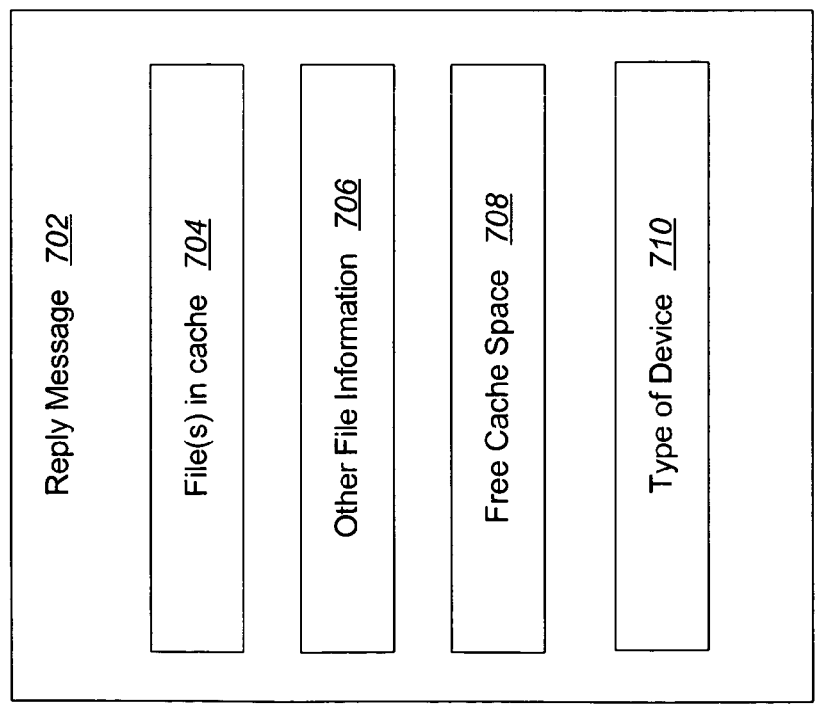
FIG. 7 is a logical block diagram of one embodiment of a reply message.

FIG. 7 is a logical block diagram of one embodiment of a reply message 702 that a peer might send indicating what files, if any, the peer has of the files in the computing device's local cache 104. The reply message 702 may include a list 704 of one or more files that it does contain in its local cache 104. Other file information 706 may also be included in the reply message 702 that is relevant to the files identified by the file(s) in the cache 104. The reply message 702 may also indicate how much free space 708 is available in its cache 104. A type of device 710 field may indicate what kind of computing device the peer is. For example, if the peer is a mobile computing device, it may indicate that it is mobile in the type of device field 710.

Figure 8:
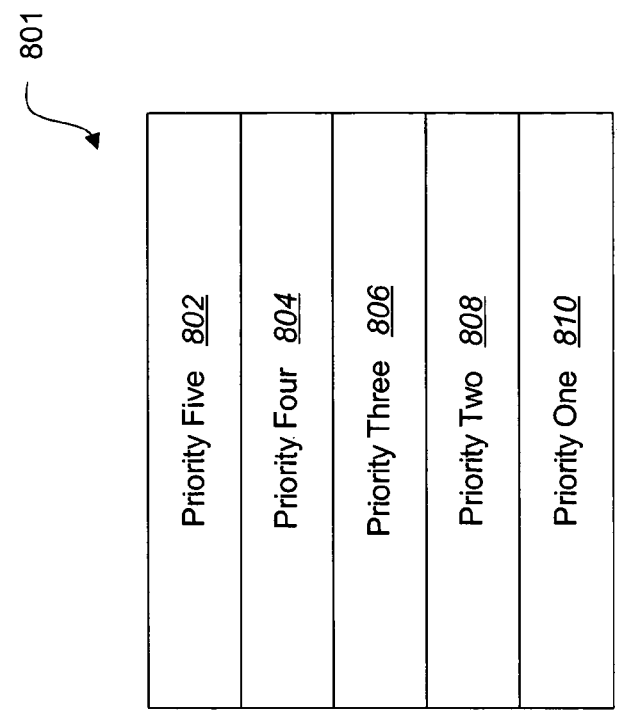
FIG. 8 is a diagram illustrating one possible range of priorities that may be used by the system.

FIG. 8 is a diagram illustrating one possible range of priorities 801 that may be used by the system. Priority one 810 may be the lowest priority with priority five 802 being the highest priority. In one implementation, the highest priority level five 802 indicates that this file cannot be deleted from the cache. The systems and methods herein may assign a priority level four 804 if no peers have that same file in their local caches. Priority three 806 may be used to indicate that only one peer has the file, and that peer is a mobile peer or is only configured to keep the file for a short period of time. Priority two 808 may be used to indicate that only one peer has the same file in its local cache. Priority one 810 may be used to indicate that two or more peers have the same file in their local caches.

In practicing the methods herein, the computing device may assign the priority to a file in its cache based on the settings above. However, other means may be assigned to the priorities. In addition, a different priority scheme and methodology may also be used.

Figure 9:
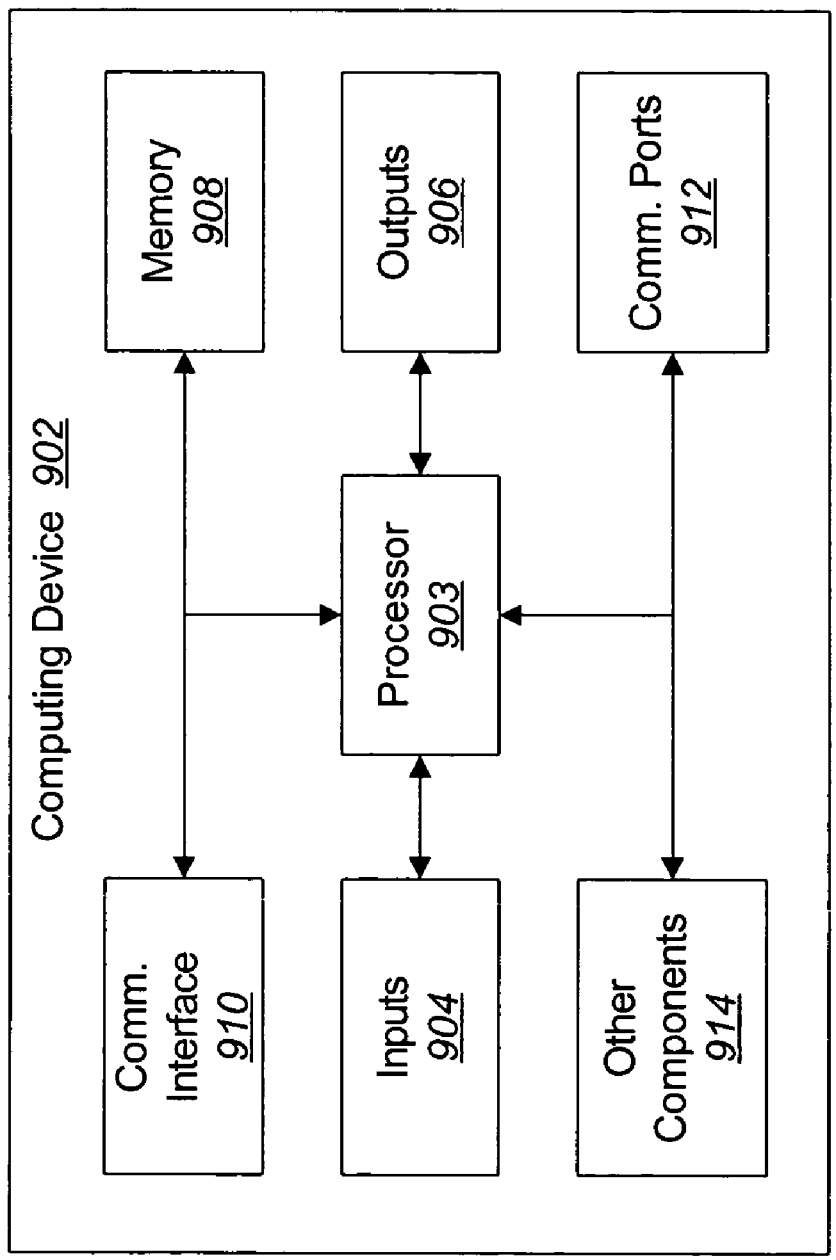
FIG. 9 is a block diagram illustrating the major hardware components typically utilized in a computer or computing device.

FIG. 9 is a block diagram illustrating the major hardware components typically utilized in a computing device used with embodiments herein. Computers and/or computing devices 902 are known in the art and are commercially available. The major hardware components typically utilized in a computing device 902 are illustrated in FIG. 9. A computing device 902 typically includes a processor 903 in electronic communication with input components or devices 904 and/or output components or devices 906. The processor 903 is operably connected to input 904 and/or output devices 906 capable of electronic communication with the processor 903, or, in other words, to devices capable of input and/or output in the form of an electrical signal. Embodiments of devices 902 may include the inputs 904, outputs 906 and the processor 903 within the same physical structure or in separate housings or structures.

The electronic device 902 may also include memory 908. The memory 908 may be a separate component from the processor 903, or it may be on-board memory 908 included in the same part as the processor 903. For example, microcontrollers often include a certain amount of on-board memory. The memory 908 may be embodied in RAM, a hard drive, a CD-ROM drive, a DVD-ROM drive, network storage, etc. The memory 908 is broadly defined as any electronic component capable of storing electronic information.

The processor 903 is also in electronic communication with a communication interface 910. The communication interface 910 may be used for communications with other devices 902. Thus, the communication interfaces 910 of the various devices 902 may be designed to communicate with each other to send signals or messages between the computing devices 902. A network card or wireless card may be used to implement a communication interface 910.

The computing device 902 may also include other communication ports 912. In addition, other components 914 may also be included in the electronic device 902.

Of course, those skilled in the art will appreciate the many kinds of different devices that may be used with embodiments herein. The computing device 902 may be a one-chip computer, such as a microcontroller, a one-board type of computer, such as a controller, a typical desktop computer, such as an IBM-PC compatible, a Personal Digital Assistant (PDA), a Unix-based workstation, a router, etc. Accordingly, the block diagram of FIG. 9 is only meant to illustrate typical components of a computer or computing device 902 and is not meant to limit the scope of embodiments disclosed herein.

FIG. 9 illustrates a computer system 902 that includes or is in electronic communication with a machine-readable medium (memory) on which is stored a set of instructions according to embodiments herein. Although described in the context of a computer system 902, the embodiments herein may be implemented in any suitable computer system comprising any suitable one or more integrated circuits.

Accordingly, computer system 902 includes or is in communication with a computer-readable medium on which is stored a set of instructions (i.e., software) embodying any one, or all, of the methodologies described above. For example, software can reside, completely or at least partially, within main memory and/or within processors 903. For the purposes of this specification, the term "computer-readable medium" shall be taken to include any mechanism that provides (i.e., stores) information in a form readable by a machine (e.g., a computer). For example, a computer-readable medium includes read only memory (ROM); random access memory (RAM); magnetic disk storage media; optical storage media; or flash memory devices.

Figure 10:
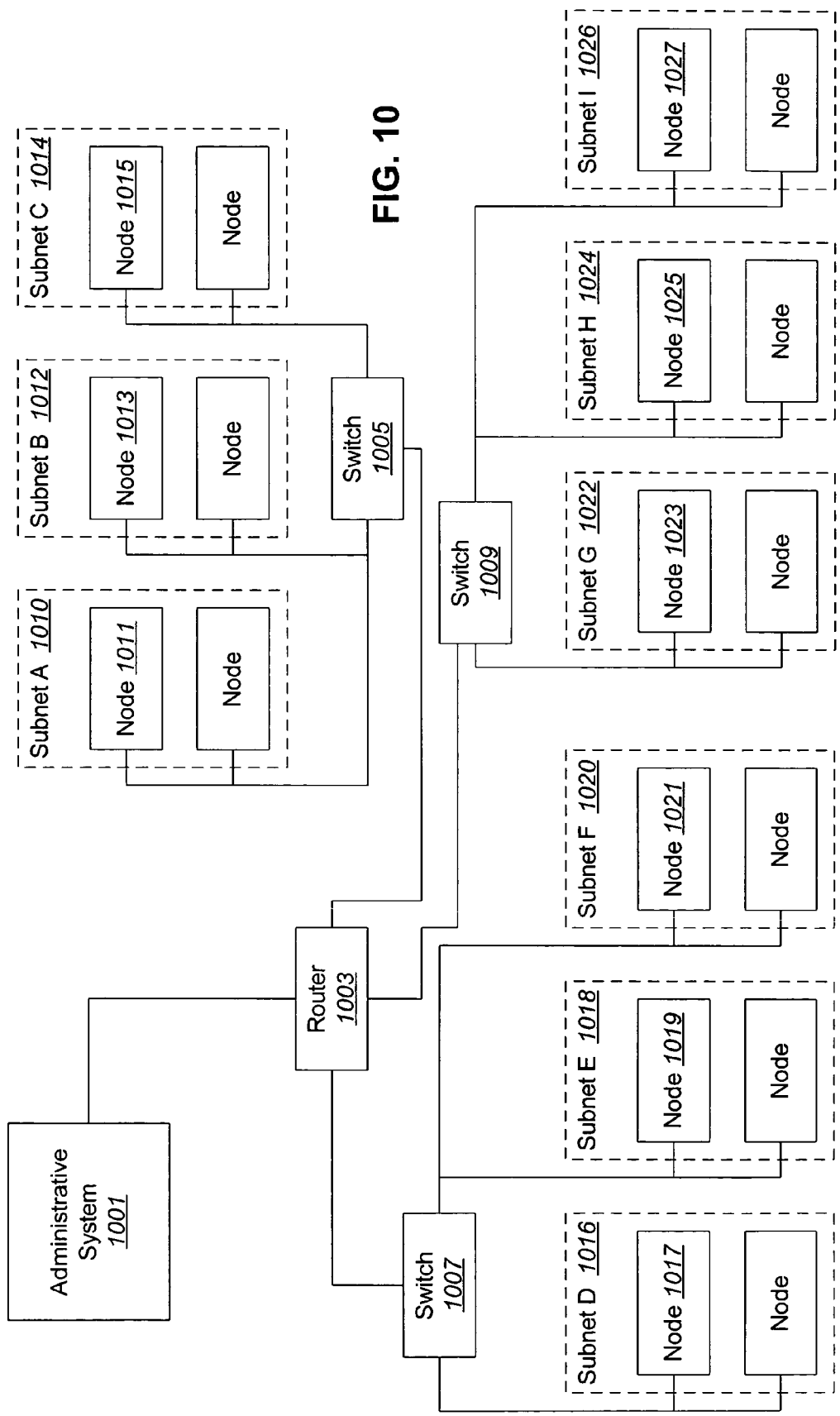
FIG. 10 is an exemplary block diagram illustrating a computer network on which the present systems and methods may be implemented.

FIG. 10 is an exemplary block diagram illustrating a computer network on which the present systems and methods may be implemented. In FIG. 10, an administrative system 1001 connects to a router 1003.

The router 1003 may be connected to three switches: a first switch 1005, a second switch 1007 and a third switch 1009. Each switch 1005, 1007, 1009 connects to three subnets. The first switch 1005 connects to three subnets 1010, 1012, and 1014. The second switch 1007 connects to three subnets 1016, 1018, and 1020. The third switch 1009 connects to three subnets 1022, 1024, and 1026. The network nodes or elements 1011, 1013, 1015, 1017, 1019, 1021, 1023, 1025 and 1027 represent computer systems or devices on the computer network. One or more of the nodes may use embodiments of the imaging systems and methods herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

By utilizing information about what files other peers have, it is possible for the clients to delete files from their cache is such a manner as to keep the file as readily available as needed. For example, the file may be kept on the same subnet, in the same multicast alias domain, on the same computer network, on the same side of a wireless link, etc. For example, with wireless links and multicast alias domains, this method reduces the likelihood of any machine in the multicast domain needing to download the file using a WAN link. Because LAN bandwidth is less costly than WAN bandwidth keeping files available in the LAN helps to reduce the cost of deploying those files to machines in the LAN using a peer to peer multicast or other solutions.

One of the reasons for using peer to peer technologies is to reduce the number of times that information needs to be retrieved from a remote location. This is important because whenever a file needs to be retrieved from a remote location it must be transmitted over a WAN link, and the bandwidth cost of WAN links is typically several times greater than the LAN counterpart.

This caching solution provides a method to ensure that files remain available on the LAN for as long as possible. By using a peer to peer approach each individual machine is better able to make intelligent decisions regarding what to delete and what to keep. This technology allows software distribution and other file deployment technologies to more intelligently preserve the WAN bandwidth used in deploying the file or package to the individual machines.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for managing a distributed cache, the method comprising:
   providing, in a local computing device, a local cache that is part of a distributed cache;
   requesting, by the local computing device, remote cache information for a file from at least one peer;
   receiving, by the local computing device, the remote cache information from the at least one peer, wherein the remote cache information comprises a message that indicates whether the at least one peer includes the file;
   determining a priority of the file in the local cache based on the remote cache information, wherein the priority of the file in the local cache is determined based on the number of peers that include the file in a remote cache, wherein the determined priority of the file is selected from a range of priority levels comprising of at least a first priority level, a second priority level and a third priority level, wherein at least one of the priority levels prevents the file from being deleted from the local cache; and
   beginning a local cache reduction operation that uses the priority to determine whether the file is deleted.

2. The method of claim 1, wherein the local cache and the remote cache are both part of the distributed cache.

3. The method of claim 2, wherein the local cache comprises a plurality of files.

4. The method of claim 3, wherein the remote cache information comprises a file list identifying files in the remote cache.

5. The method of claim 4, further comprising determining a priority for each file of the plurality of files in the local cache.

6. The method of claim 5, further comprising deleting multiple files from the local cache, wherein each of the multiple files had the lowest priority in the local cache.

7. The method of claim 4, wherein the remote cache information further comprises free cache space information.

8. The method of claim 7, wherein the remote cache information further comprises a type of device.

9. The method of claim 8, wherein the remote cache information further comprises a remote priority for each of the files in the remote cache.

10. The method of claim 1, further comprising requesting remote cache information from a plurality of peers.

11. The method of claim 10, wherein the remote cache information is requested from a plurality of peers of the same multicast alias domain.

12. The method of claim 1, wherein the first priority level prevents the file from being deleted from the local cache, the second priority level indicates that no peers have the file, the third level indicates that one peer has the file.

13. The method of claim 12, wherein the third priority level further indicates that one peer has the file and is only configured to keep the file for a short period of time, a fourth priority level indicates that one peer has the file in its cache, and a fifth priority level indicates that two or more peers have the file.

14. The method of claim 1, wherein the requesting comprises requesting remote cache information for a file with a lower priority before requesting remote cache information for a file with a higher priority.

15. The method of claim 1, wherein the receiving comprises receiving remote cache information that was multicasted or broadcasted by the at least one peer.

16. A computer-readable medium for storing program data, wherein the program data comprises executable instructions to:
   identify a local cache, in a local computing device, that is part of a distributed cache, wherein the local cache comprises a plurality of local files;
   request, by the local computing device, remote cache information from a plurality of peers;
   receive, by the local computing device, the remote cache information, wherein the remote cache information comprises a file list identifying files in one or more remote caches;
   determine a priority for each file of the plurality of local files based on the remote cache information, wherein the priority of each file of the plurality of local files is determined based on the number of peers that include each file of the plurality of files in a remote cache, wherein the determined priority of each file is selected from a range of priority levels comprising of at least a first priority level, a second priority level and a third priority level, wherein at least one of the priority levels prevents the file from being deleted from the local cache; and
   begin a local cache reduction operation that uses the priority to determine whether a local file is deleted.

17. The computer-readable medium of claim 16, wherein the method further comprises deleting at least one local file from the local cache, wherein the at least one local file had the lowest priority in the local cache.

18. The computer-readable medium of claim 17, wherein the remote cache information further comprises free cache space information.

19. The computer-readable medium of claim 18, wherein the remote cache information further comprises a type of device.

20. The computer-readable medium of claim 16, wherein the remote cache information is requested from a plurality of peers of the same multicast alias domain.

21. A system for managing a local cache that is part of a distributed cache, the system comprising:
   a computing device;
      a computer-readable medium that is part of the computing device or in electronic communication with the computing device, the computer-readable medium comprising executable instructions to:
         identify the local cache, in the computing device, that is part of the distributed cache, wherein the local cache comprises a plurality of local files;
         request remote cache information from a plurality of peers;
         receive the remote cache information, wherein the remote cache information comprises a message that indicates whether the at least one peer includes each file of the plurality of local files;
         determine a priority for each file of the plurality of local files based on the remote cache information, wherein the priority of each file of the plurality of local files is determined based on the number of peers that include each file of the plurality of files in a remote cache, wherein the determined priority of each file is selected from a range of priority levels comprising of at least a first priority level, a second priority level and a third priority level, wherein at least one of the priority levels prevents the file from being deleted from the local cache; and
         begin a local cache reduction operation that uses the priority to determine whether a local file is deleted.

22. The system of claim 21, wherein the method further comprises deleting at least one local file from the local cache, wherein the at least one local file had the lowest priority in the local cache.

23. The system of claim 22, wherein the remote cache information further comprises free cache space information.

24. The system of claim 23, wherein the remote cache information further comprises a type of device.

25. The system of claim 24, wherein the remote cache information is requested from a plurality of peers of the same multicast alias domain.

26. The system of claim 25, wherein the remote cache information further comprises a file list identifying files in one or more remote caches.

27. A method for managing a distributed cache, the method comprising:
   providing a local cache, in a local computing device, that is part of a distributed cache;
   monitoring, by the local computing device, cache-related messages from a plurality of peers, wherein the cache-related messages indicate whether the plurality of peers include a file;
   updating a priority of the file in the local cache based on the cache-related messages from the plurality of peers, wherein the priority of the file in the local cache is updated based on the number of peers that include the file in a remote cache, wherein the priority of the file is selected from a range of priority levels comprising of at least a first priority level, a second priority level and a third priority level, wherein at least one of the priority levels prevents the file from being deleted from the local cache; and
   beginning a local cache reduction operation that uses the priority to determine whether the file is deleted.

28. The method of claim 27, wherein the monitoring is performed continuously.

29. The method of claim 28, wherein the local cache reduction operation does not iterate through all files in the local cache.

30. The method of claim 29, further comprising deleting multiple files from the local cache, wherein each of the multiple files had the lowest priority in the local cache.

31. A system for managing a local cache that is part of a distributed cache, the system comprising:
   a computing device;
      a computer-readable medium that is part of the computing device or in electronic communication with the computing device, the computer-readable medium comprising executable instructions to:
         identify, in a local computing device, the local cache that is part of the distributed cache, wherein the local cache comprises a plurality of local files;
         monitor, by the local computing device, cache-related messages from a plurality of peers, wherein the cache-related messages indicate whether the plurality of peers include a file;
         update a priority of the file in the local cache based on the cache-related messages from the plurality of peers, wherein the priority of the file in the local cache is determined based on the number of peers that include the file in a remote cache, wherein the determined priority of the file is selected from a range of priority levels comprising of at least a first priority level, a second priority level and a third priority level, wherein at least one of the priority levels prevents the file from being deleted from the local cache; and
         begin a local cache reduction operation that uses the priority to determine whether the file is deleted.

32. The system of claim 31, wherein the method further comprises updating a plurality of file priorities in the local cache based on the cache-related messages from the plurality of peers.

33. The system of claim 31, wherein the method further comprises deleting at least one local file from the local cache, wherein the at least one local file had the lowest priority in the local cache.

34. The system of claim 33, wherein the monitoring of the cache-related messages from the plurality of peers is performed continuously.

35. The system of claim 34, wherein the local cache reduction operation does not iterate through all files in the local cache.

* * * * *